(12) United States Patent
Morales et al.

(10) Patent No.: US 10,949,390 B2
(45) Date of Patent: Mar. 16, 2021

(54) ASYNCHRONOUS QUERIES ON SECONDARY DATA CORES IN A DISTRIBUTED COMPUTING SYSTEM

(71) Applicant: VMware Inc., Palo Alto, CA (US)

(72) Inventors: Ramsés V. Morales, Sunnyvale, CA (US); Mirza Mohsin Beg, Foster City, CA (US); Shashank Pedamallu, Mountain View, CA (US)

(73) Assignee: VMware Inc., Palo Alto, CA (US)

( * ) Notice: Subject to any disclaimer, the term of this patent is extended or adjusted under 35 U.S.C. 154(b) by 281 days.

(21) Appl. No.: 15/925,464

(22) Filed: Mar. 19, 2018

(65) Prior Publication Data
US 2019/0286719 A1   Sep. 19, 2019

(51) Int. Cl.
*G06F 17/00* (2019.01)
*G06F 16/14* (2019.01)
*G06F 3/06* (2006.01)
*G06F 9/455* (2018.01)
*G06F 16/182* (2019.01)

(52) U.S. Cl.
CPC .......... *G06F 16/148* (2019.01); *G06F 3/0608* (2013.01); *G06F 3/0647* (2013.01); *G06F 9/45558* (2013.01); *G06F 16/1824* (2019.01); *G06F 2009/45583* (2013.01); *G06F 2009/45595* (2013.01)

(58) Field of Classification Search
CPC .. G06F 16/148; G06F 16/1824; G06F 3/0608; G06F 3/0647; G06F 9/45558; G06F 2009/45583; G06F 2009/45595; G06F 3/061; G06F 3/0685; G06F 3/0649; G06F 16/2471
See application file for complete search history.

(56) References Cited

U.S. PATENT DOCUMENTS

| | | | | |
|---|---|---|---|---|
| 2004/0215644 | A1* | 10/2004 | Edwards, Jr. | G06F 3/0601 |
| 2005/0114505 | A1* | 5/2005 | DeStefano | H04L 43/0876 |
| | | | | 709/224 |
| 2011/0153953 | A1* | 6/2011 | Khemani | G06F 12/0815 |
| | | | | 711/136 |
| 2016/0358084 | A1* | 12/2016 | Bloomquist | G06N 5/046 |

OTHER PUBLICATIONS

IBM. "Planning your log archive storage". 2020. (Year: 2020).*

* cited by examiner

*Primary Examiner* — Syed H Hasan
(74) *Attorney, Agent, or Firm* — Dentons US LLP

(57) ABSTRACT

The present disclosure relates generally to techniques for processing asynchronous queries across multiple data cores including secondary data cores stored in the secondary storage system in a distributed computing system. Secondary data cores are recovered in the data plane from secondary storage in order to be accessible for searching. Using this technique, asynchronous queries are run in parallel allowing the client to dynamically manage the queries and receive notifications when results are available.

33 Claims, 8 Drawing Sheets

Dashboard 500

|     | Query   | Type   | Start | Stop | Status      | Details |
|-----|---------|--------|-------|------|-------------|---------|
| 502 | Query 1 | Asynch | Start | Stop | Running | URL |
| 504 | Query 2 | Asynch | Start | Stop | Stopped | URL |
| 506 | Query 3 | Asynch | Start | Stop | Not started | ------ |

FIG. 5

ASYNCHRONOUS QUERIES ON SECONDARY DATA CORES IN A DISTRIBUTED COMPUTING SYSTEM

FIELD

The current application relates generally to processing queries in a distributed computing system, and more specifically to asynchronous queries for data items stored across multiple data cores including secondary data cores stored in a secondary storage system in a distributed computing system.

BACKGROUND

Modern distributed information systems are increasingly complex and can include thousands of host computing devices, virtual machines (VMs) and networking components, servicing an even larger number of clients. Components of these systems produce massive volumes of machine-generated log data (application logs, network traces, configuration files, messages, performance data, system state dumps, etc.). Log data provides valuable information to system administrators as they manage these complex systems. Log data can also be useful in troubleshooting, discovering trends, detecting security problems, and measuring performance. Thus, it is important for a user to be able to query for specific log data or records.

In a distributed computing system where log data is stored across multiple data cores in data planes and secondary storage systems, it is challenging to determine which data core to query for log data that was generated at a specific time. This is further complicated by the fact that a data core may not be immediately available for querying, because it may have been unloaded from the data plane and moved to a secondary storage system. Efficiently querying secondary data cores, or data cores that have been moved to a secondary storage system raises multiple challenges. One issue is the inevitable increase in time-to-first-byte (TTFB) caused by having to recover a secondary data core in the data plane before it can be searched. This makes it difficult for applications to use traditional synchronous API calls to issue a query, because the expected TTFB exceeds the query cancellation time causing the query to time out. As the volume of log data continues to grow, it is inevitable that older data cores will be moved to a secondary storage system to make space for new data cores in the data plane. The need for a more efficient and scalable technique for searching data cores and secondary data cores for targeted searches becomes more readily apparent.

SUMMARY

The present disclosure relates generally to techniques for processing asynchronous queries across multiple data cores including secondary data cores stored in a secondary storage system in a distributed computing system. Secondary data cores are recovered in the data plane before they are accessible for searching. Using this technique, asynchronous queries may be run in parallel allowing the client to dynamically manage the queries and receive notifications when results are available.

In some embodiments, a method is described. The method describes processing a received search request for one or more data items, wherein the search request includes a specified time range; determining whether one or more secondary data cores of the plurality of secondary data cores contain one or more data items corresponding to the specified time range; in accordance with a determination that one or more secondary data cores of the plurality of secondary data cores contain one or more data items corresponding to the specified time range: determining whether an amount of available storage in the data plane satisfies one or more predetermined criteria required to recover at least one secondary data core of the one or more secondary data cores in the data plane; in accordance with a determination that an amount of available storage in the data plane satisfies one or more predetermined criteria required to recover at least one secondary data core of the one or more secondary data cores in the data plane: causing recovery of the at least one secondary data core in the data plane; and executing the search request using the at least one recovered secondary data core in the data plane.

In some embodiments, the method further includes, in accordance with a determination that an amount of available storage in the data plane does not satisfy one or more predetermined criteria required to recover at least one secondary data core of the one or more secondary data cores in the data plane: forgo recovering the at least one secondary data core in the data plane; and executing the search request using one or more data cores of the plurality of data cores, the one or more data cores determined to contain one or more data items corresponding to the specified time range.

In some embodiments, the method further includes, in accordance with a determination that an amount of available storage in the data plane does not satisfy one or more predetermined criteria required to recover at least one secondary data core of the one or more secondary data cores in the data plane: performing, by the management plane, one or more operations to increase the amount of available storage in the data plane; after performing the one or more operations, causing recovery of the at least one secondary data core in the data plane; and executing the search request using the at least one recovered secondary data core.

In some embodiments, performing the one or more operations includes allocating, by the management plane, additional storage to the data plane. In some embodiments, performing the one or more operations includes selecting one or more data cores of the plurality of data cores, the one or more data cores determined to not contain any data items corresponding to the specified time range; generating one or more new secondary data cores in the secondary storage system by transferring the one or more data cores to the secondary storage system; and removing the one or more data cores from the data plane.

In some embodiments, prior to receiving the search request, the data plane includes one or more data plane containers storing the plurality of data cores, and performing the one or more operations includes: allocating an additional data plane container to the data plane; and causing recovery of the at least one secondary data core in the additional data plane container. In some embodiments, prior to receiving the search request, the data plane includes one or more data plane containers storing the plurality of data cores, and the at least one secondary data core is recovered in a data plane container of the one or more data plane containers. In some embodiments, the method further comprises causing recovery of at least one other secondary data core of the one or more secondary data cores in the data plane; replacing the at least one recovered secondary data core in the data plane with the at least one other recovered secondary data core; and executing the search request using the at least one other recovered secondary data core.

In some embodiments, the one or more predetermined criteria is based on a current ingestion rate of data items by the data plane. In some embodiments, the search request is associated with a tenant, and the one or more predetermined criteria is based on a total amount of storage allocated to the tenant for the data plane. In some embodiments, the plurality of data cores stored in the data plane are assigned to a first tenant of a plurality of tenants, and a second plurality of data cores stored in the data plane are assigned to a second tenant of a plurality of tenants. In some embodiments, the first tenant is allocated a first amount of storage in the data plane and the second tenant is allocated a second amount of storage different from the first amount of storage.

In some embodiments, the method further includes, in accordance with a determination that one or more secondary data cores of the plurality of secondary data cores contain one or more data items corresponding to the specified time range, providing an output indicating that the search request will be executed asynchronously, wherein the output is provided prior to executing the search request. In some embodiments, the method further includes, in accordance with a determination that none of the plurality of secondary data cores contain one or more data items corresponding to the specified time range: executing the search request using one or more data cores of the plurality of data cores, the one or more data cores determined to contain one or more data items corresponding to the specified time range; and forgo providing an output to a user until after a result is obtained from executing the search request using the one or more data cores.

In some embodiments, a timeout condition to cancel the search request is based on a default time period, and the method further includes, in accordance with a determination that an amount of available storage in the data plane satisfies one or more predetermined criteria required to recover at least one secondary data core of the one or more secondary data cores in the data plane, modifying the timeout condition to be based on an extended time period rather than the default time period, wherein the extended time period is based on a total number of secondary data cores in the at least one secondary data core.

In some embodiments, the method includes, in accordance with a determination that one or more secondary data cores of the plurality of secondary data cores contain one or more data items corresponding to the specified time range: causing display of a user interface containing a list of asynchronous queries being processed by the management plane, the list of asynchronous queries including the search request, wherein the user interface enables a user to stop or start execution of the search request. In some embodiments, the method includes, after completing execution of the search request, causing display of results obtained from executing the search request in response to receiving a user selection of the search request via the user interface.

In some embodiments, a method describes processing a received search request for one or more data items, wherein the search request includes a specified time range; determining whether a portion of one or more secondary data cores contains one or more data items relevant to the search request; in accordance with a determination that a portion of one or more secondary data cores contains one or more data items corresponding to the specified time range, retrieving, via an in-memory file system of the data plane, the portion of the one or more secondary data cores from the secondary storage system; and executing the search request using the portion of the one or more secondary data cores.

In some embodiments, the in-memory file system provides a mapping of files of the plurality of secondary data cores and provides the data plane access to the files of the plurality of secondary data cores.

In some embodiments, the method further includes, allocating an additional data plane container to the data plane and recovering the portion of the one or more secondary data cores in the additional data plane container. In some embodiments, the method includes, determining whether an amount of available storage in the data plane satisfies one or more predetermined criteria required to recover the portion of the one or more secondary data cores in the data plane; and in accordance with a determination that an amount of available storage in the data plane satisfies one or more predetermined criteria required to recover the portion of the one or more secondary data cores in the data plane: recovering the portion of the one or more secondary data cores in the data plane.

In some embodiments, a non-transitory computer-readable medium is described. The non-transitory computer-readable storage medium comprising one or more programs configured to be executed by one or more processors of a distributed computing system, the one or more programs including instructions for: at a management plane of the distributed computing system: processing a received search request for one or more data items, wherein the search request includes a specified time range; determining whether one or more secondary data cores of the plurality of secondary data cores contain one or more data items corresponding to the specified time range; in accordance with a determination that one or more secondary data cores of the plurality of secondary data cores contain one or more data items corresponding to the specified time range: determining whether an amount of available storage in the data plane satisfies one or more predetermined criteria required to recover at least one secondary data core of the one or more secondary data cores in the data plane; in accordance with a determination that an amount of available storage in the data plane satisfies one or more predetermined criteria required to recover at least one secondary data core of the one or more secondary data cores in the data plane: causing recovery of the at least one secondary data core in the data plane; and executing the search request using the at least one recovered secondary data core in the data plane.

In some embodiments, a transitory computer-readable medium is described. The transitory computer-readable storage medium comprising one or more programs configured to be executed by one or more processors of a distributed computing system, the one or more programs including instructions for: at a management plane of the distributed computing system: processing a received search request for one or more data items, wherein the search request includes a specified time range; determining whether one or more secondary data cores of the plurality of secondary data cores contain one or more data items corresponding to the specified time range; in accordance with a determination that one or more secondary data cores of the plurality of secondary data cores contain one or more data items corresponding to the specified time range: determining whether an amount of available storage in the data plane satisfies one or more predetermined criteria required to recover at least one secondary data core of the one or more secondary data cores in the data plane; in accordance with a determination that an amount of available storage in the data plane satisfies one or more predetermined criteria required to recover at least one secondary data core of the one or more secondary data cores in the data plane: causing recovery of the at least one secondary data core in the data plane; and executing the search request using the at least one recovered secondary data core in the data plane.

In some embodiments, a distributed computing system is described. The distributed computing system comprising: one or more processors and a memory storing one or more programs configured to be executed by the one or more processors, the one or more programs including instructions for: at a management plane of the distributed computing system: processing a received search request for one or more data items, wherein the search request includes a specified time range; determining whether one or more secondary data cores of the plurality of secondary data cores contain one or more data items corresponding to the specified time range; in accordance with a determination that one or more secondary data cores of the plurality of secondary data cores contain one or more data items corresponding to the specified time range: determining whether an amount of available storage in the data plane satisfies one or more predetermined criteria required to recover at least one secondary data core of the one or more secondary data cores in the data plane; in accordance with a determination that an amount of available storage in the data plane satisfies one or more predetermined criteria required to recover at least one secondary data core of the one or more secondary data cores in the data plane: causing recovery of the at least one secondary data core in the data plane; and executing the search request using the at least one recovered secondary data core in the data plane.

In some embodiments, a distributed computing system is described. The distributed computing system comprising means for: at a management plane of the distributed computing system: means for processing a received search request for one or more data items, wherein the search request includes a specified time range; means for determining whether one or more secondary data cores of the plurality of secondary data cores contain one or more data items corresponding to the specified time range; means for in accordance with a determination that one or more secondary data cores of the plurality of secondary data cores contain one or more data items corresponding to the specified time range: means for determining whether an amount of available storage in the data plane satisfies one or more predetermined criteria required to recover at least one secondary data core of the one or more secondary data cores in the data plane; means for in accordance with a determination that an amount of available storage in the data plane satisfies one or more predetermined criteria required to recover at least one secondary data core of the one or more secondary data cores in the data plane: means for causing recovery of the at least one secondary data core in the data plane; and means for executing the search request using the at least one recovered secondary data core in the data plane.

In some embodiments, a non-transitory computer-readable medium is described. The non-transitory computer-readable storage medium comprising one or more programs configured to be executed by one or more processors of a distributed computing system, the one or more programs including instructions for: at a management plane of the distributed computing system: processing a received search request for one or more data items, wherein the search request includes a specified time range; determining whether a portion of one or more secondary data cores contains one or more data items relevant to the search request; in accordance with a determination that a portion of one or more secondary data cores contains one or more data items corresponding to the specified time range, retrieving, via an in-memory file system of the data plane, the portion of the one or more secondary data cores from the secondary storage system; and executing the search request using the retrieved portion of the one or more secondary data cores.

In some embodiments, a transitory computer-readable medium is described. The transitory computer-readable storage medium comprising one or more programs configured to be executed by one or more processors of a distributed computing system, the one or more programs including instructions for: at a management plane of the distributed computing system: processing a received search request for one or more data items, wherein the search request includes a specified time range; determining whether a portion of one or more secondary data cores contains one or more data items corresponding to the specified time range; in accordance with a determination that a portion of one or more secondary data cores contains one or more data items relevant to the search request, retrieving, via an in-memory file system of the data plane, the portion of the one or more secondary data cores from the secondary storage system; and executing the search request using the retrieved portion of the one or more secondary data cores.

In some embodiments, a distributed computing system is described. The distributed computing system comprising: one or more processors and a memory storing one or more programs configured to be executed by the one or more processors, the one or more programs including instructions for: at a management plane of the distributed computing system: at a management plane of the distributed computing system: processing a received search request for one or more data items, wherein the search request includes a specified time range; determining whether a portion of one or more secondary data cores contains one or more data items corresponding to the specified time range; in accordance with a determination that a portion of one or more secondary data cores contains one or more data items corresponding to the specified time range, retrieving, via an in-memory file system of the data plane, the portion of the one or more secondary data cores from the secondary storage system; and executing the search request using the retrieved portion of the one or more secondary data cores.

In some embodiments, a distributed computing system is described. The distributed computing system comprising means for: at a management plane of the distributed computing system: means for processing a received search request for one or more data items, wherein the search request includes a specified time range; means for determining whether a portion of one or more secondary data cores contains one or more data items relevant to the search request; means for in accordance with a determination that a portion of one or more secondary data cores contains one or more data items corresponding to the specified time range, retrieving, via an in-memory file system of the data plane, the portion of the one or more secondary data cores from the secondary storage system; and means for executing the search request using the retrieved portion of the one or more secondary data cores.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

FIG. 5 depicts an exemplary user interface for managing the asynchronous queries that have been executed by an exemplary management plane.

DETAILED DESCRIPTION

In the following description of embodiments, reference is made to the accompanying drawings in which are shown by way of illustration specific embodiments that can be practiced. It is to be understood that other embodiments can be used and structural changes can be made without departing from the scope of the various embodiments.

The present disclosure provides techniques for processing time-range queries on data items stored across a plurality of data cores of a data plane and a plurality of secondary data cores of a secondary storage system in a distributed computing system. The management plane of the distributed computing system processes a received search request for data items within a specified time range by determining whether the data items are stored in the plurality of data cores and/or the plurality of secondary data cores. If data items are determined to reside on secondary data cores, then the management plane determines whether to recover the secondary data cores in the data plane in order to access and search data stored in the secondary data core. In particular, data cores in the data plane are referred to as "hot data cores" because the data stored in the data cores are immediately accessible to the data plane. Secondary data cores in the secondary storage system are referred to as "warm data cores" because the data stored in the secondary data cores are not immediately accessible to the data plane. In order for the data plane to access data stored in a secondary data core, the secondary data core needs to be recovered and restored in the data plane. During secondary data core recovery, the secondary data core is converted from a "warm data core" to a "hot data core" in the data plane, thereby enabling the data plane to access and search data stored on the secondary data core. As described in greater detail below, search requests that require data from secondary data cores are executed asynchronously, while search requests that do not are executed synchronously.

Figure 1A:
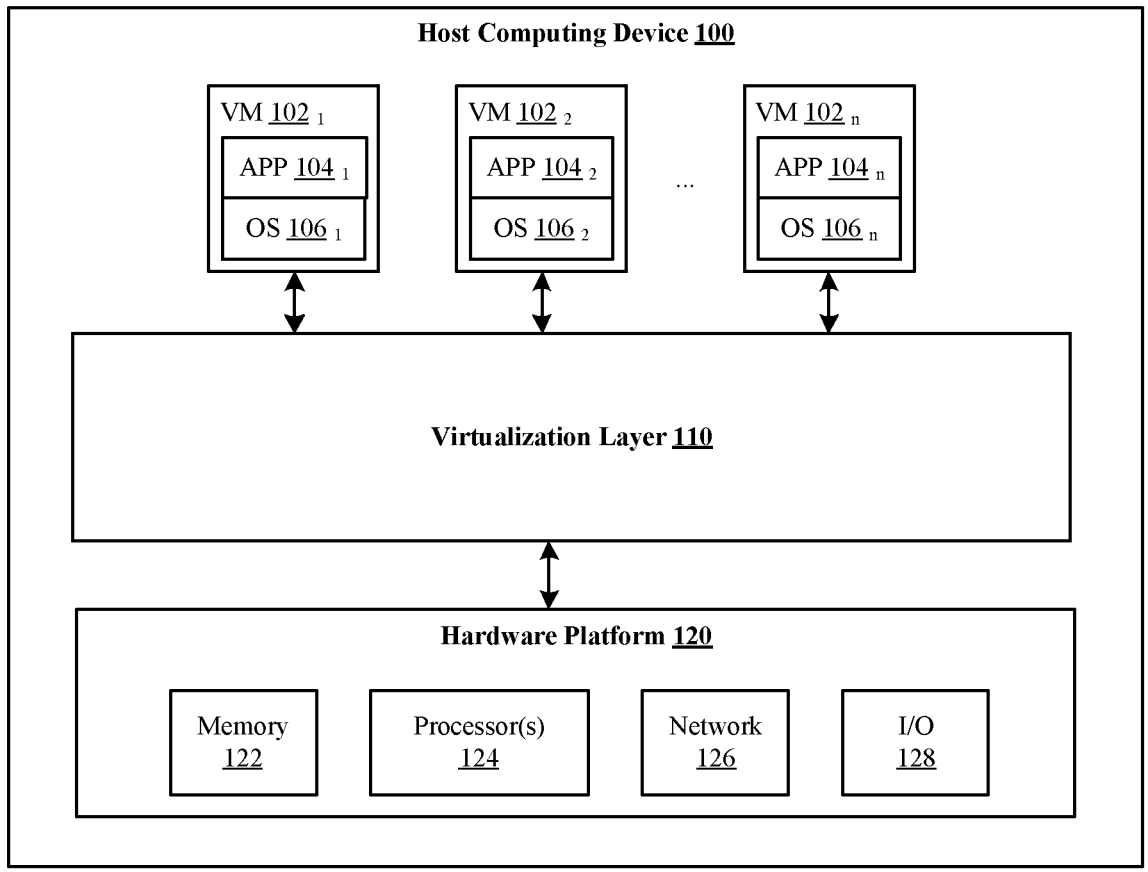
FIG. 1A depicts a block diagram illustrating an exemplary system and environment for implementing various components of a distributed computing system.

FIG. 1A is a block diagram illustrating an exemplary system and environment for implementing various components of a distributed computing system. As shown, virtual machines (VMs) 1021, 1022 . . . 120n are instantiated on host computing device 100. In some embodiments, host computing device 100 implements one or more elements of a distributed computing system (e.g., distributed computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g., a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e., programs containing software code) and the hardware resources used to execute or run applications. However, in this case, the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
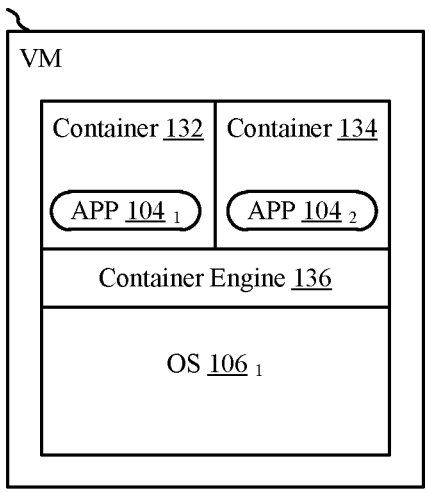
FIG. 1B depicts a block diagram illustrating an exemplary containerized application framework for implementing various components of a distributed computing system.

FIG. 1B is a block diagram illustrating an exemplary containerized application framework for implementing various components of a distributed computing system. More specifically, FIG. 1B illustrates VM 1021 implementing a containerized application framework. Containerization provides an additional level of abstraction for applications by packaging a runtime environment with each individual application. Container 132 includes App 1041 (i.e., application code), as well as all the dependencies, libraries, binaries, and configuration files needed to run App 1041. Container engine 136, similar to virtualization layer 110 discussed above, abstracts App 1041 from OS 1061, while enabling other applications (e.g., App 1042) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present invention are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
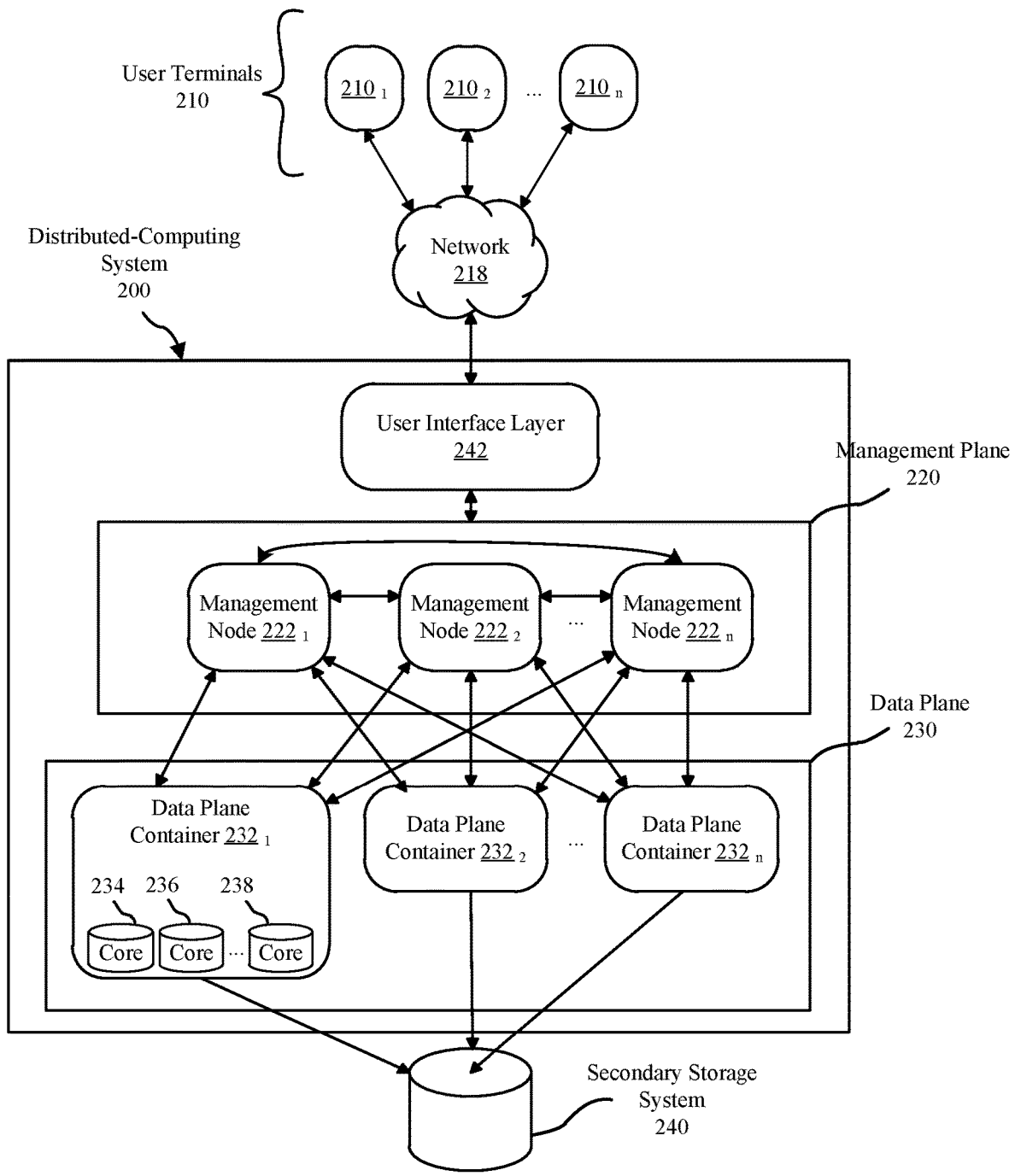
FIG. 2 depicts a block diagram illustrating exemplary systems and environment for searching log data in a distributed computing system.

FIG. 2 illustrates exemplary systems and environment for searching and retrieving data stored in distributed computing system 200. As shown, user terminals 210 are coupled to distributed computing system 200 through one or more communication networks 218. In particular, user terminals 210 communicate with user interface layer 242 of distributed computing system 200 via communication networks 218. The user interface layer 242 is configured to provide user interface functionalities via user terminals 210. The functionalities include, for example, searching for items stored by distributed computing system 200 and/or secondary storage system, displaying results of a query, analyzing results of a query, etc. In some embodiments, the user interface layer 242 runs on a dedicated physical host, as an application within a virtual machine, within a software container on a dedicated host, within a software container on a virtual machine, or any combination thereof. The user interface layer 242 is coupled to management plane 220 of distributed computing system 200. In some embodiments, user terminals 210 communicate with management plane 220 via user interface layer 242. In some embodiments, additional hardware and software components facilitate the transmission of data between user terminals 210 and management plane 220. For example, data can pass through a proxy server or load balancer before arriving at management nodes 222 within management plane 220.

Examples of communication network(s) 218 include local area networks (LAN) and wide area networks (WAN), e.g., the Internet. Communication network(s) 118 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. Further, it is appreciated that, in some embodiments, physical communication networks, such as described above, are also be implemented as software defined networks (SDN) or through software emulation.

Distributed computing system 200 includes management plane 220 and data plane 230. The terms "management plane" and "data plane" refer to functional descriptions of elements of distributed computing system 200 that perform specialized functions. Management plane 220 implements all business and management logic which allow an administrator to configure distributed computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 provides a single API entry point to distributed computing system 200.

Management plane 220 includes one or more management nodes 222. Each management node 220 is an instantiation of management software (e.g., an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to the data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g., $222_1$) experiences a failure, another management node (e.g., $222_2$) can take over to maintain management functionality.

Data plane 230 is coupled to management plane 220. Data plane 230 is configured to perform data processing functionality. For example, data plane 230 implements packet switching, filtering, tagging, routing logic, and the like. In some embodiments, data plane 230 is configured to ingest and index data received from management plane and query stored data. The data plane 230 implements a database platform that provides database search functionality, such as text searching, hit highlighting, faceted searching, and indexing of items. The database platform is, for example, an Apache Solr™ based platform (developed by the Apache Software Foundation) that includes one or more Solr™ instances. Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM $102_1$ on host computing device 100. Each data plane container 232 is associated with one or more data cores (e.g., cores 234, 236, and 238). A data core is an allocation of memory or storage resources for files associated with a single tenant or customer. In some embodiments, a core spans one or more storage media such as hard disks, solid state drives, virtual storage area network devices (VSANs), or the like. In some embodiments, each data core includes a database index with configuration, such as schema, caching, and the like. For example, each data core includes a set of memory structures that manages database files. In a specific example, each data core comprises a Solr™ core that includes a Lucene™ index.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

Although in the present embodiment, distributed computing system 200 includes management plane 220 and data plane 230, it should be recognized that, in other embodiments, distributed computing system 200 can include additional functional layers. For example, distributed computing system 200 can include additional software layers (e.g., applications) that facilitate functions related to providing alerts or notifications. In some embodiments, distributed computing systems 200 includes additional intermediate software layers for handling ingestion requests or user queries.

With reference to FIGS. 3-7, exemplary techniques for asynchronously querying secondary data cores and recovering a secondary data core by recovering it in the data plane are described below. Further, a user interface displaying a dashboard of the list of executed queries is described below.

Figure 3A:
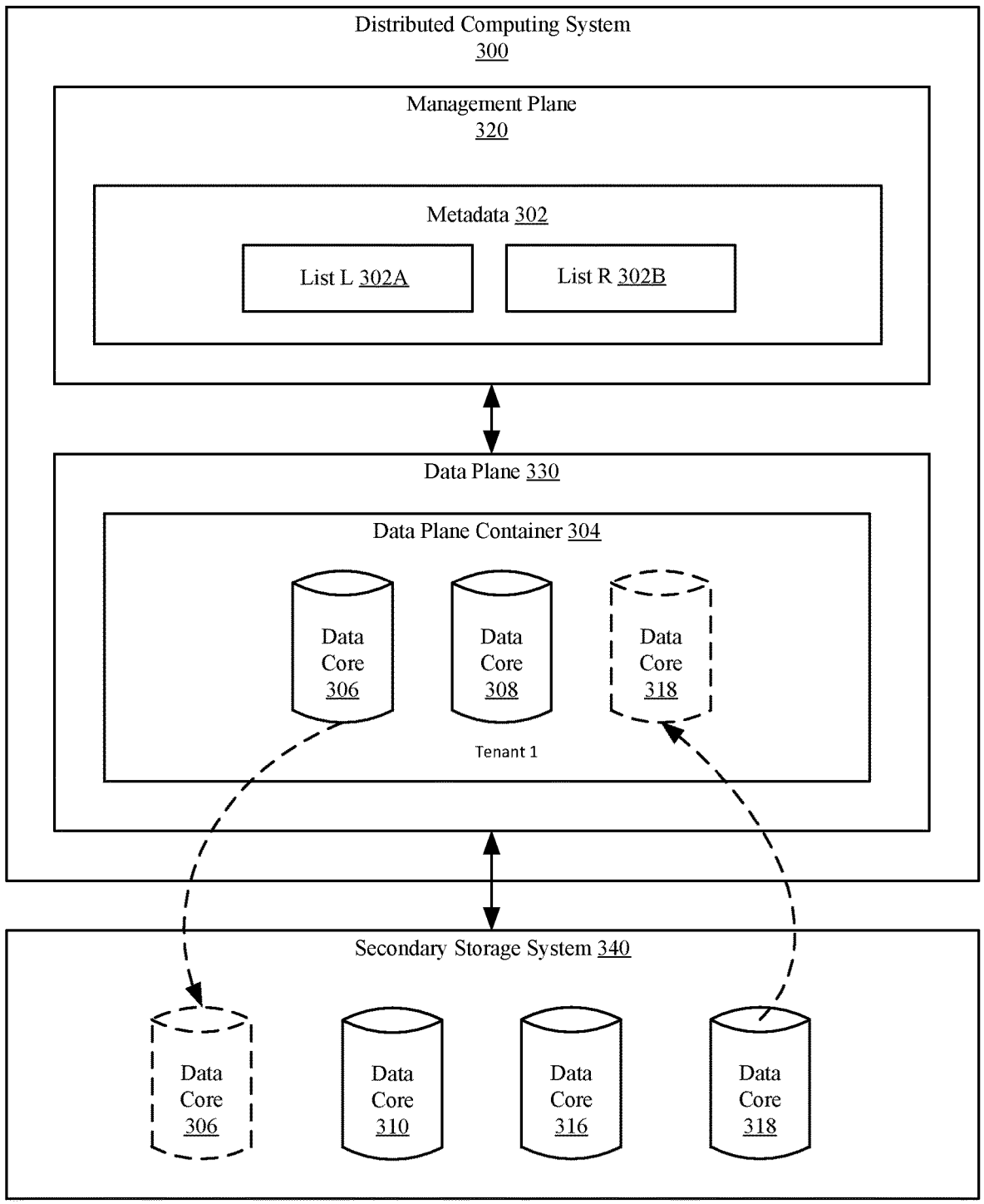
FIG. 3A depicts an exemplary system including a management plane, an exemplary data plane and an exemplary secondary storage system, where an exemplary secondary data core in a secondary storage system is recovered in an exemplary existing data plane container.

FIG. 3A depicts an exemplary distributed computing system 300 similar to distributed computing system 200 in FIG. 2. In some embodiments, management plane 320, data plane 330, and secondary storage system 340 are similar to management plane 220, data plane 230, and secondary storage system 240, respectively. In some embodiments, data cores provide memory or storage resources in which to store data files or records.

In some embodiments, data plane container 304 in data plane 330 includes data cores 306 and 308 that are assigned to a single tenant 1. In some embodiments, data plane container 304 is assigned to a single tenant who pays for the storage space of the entire data plane container. In some embodiments, data plane container 304 is shared by several tenants, where data core 306 is assigned to a first tenant and data core 308 is assigned to a second tenant. In some embodiments, data plane container 304 is shared by multiple tenants who have each paid for a different amount of storage space in the shared data plane container. In some embodiments, data plane 330 contains one or more data plane containers, where each data plane container includes data cores assigned to one or more tenants.

In some embodiments, management plane 320 receives and processes search requests for data items stored in data plane 330 and secondary storage system 340. In some embodiments, a query is an embodiment of a search request. The search request is received, for example, from a user terminal (e.g., user terminal 210) via a user interface layer (e.g., user interface layer 242). In some embodiments, management plane 320 determines whether the search request should be executed on any secondary data cores (e.g., secondary data cores 310, 316, and 318), which are data cores that are stored in exemplary secondary storage system 340. In some embodiments, if tenant 1 runs out of storage in data plane container 304, data cores 306 and 308 may be retired from the data plane container 304 to secondary storage 340 in order to free up enough storage space to recover data cores in data plane container 304. In some embodiments, older data cores are retired before newer data cores. In some embodiments, secondary data cores (e.g., data cores 310, 316, and 318) are not directly accessible in data plane 330 until they are recovered in data plane container 304 in data plane 330. For example, data plane 330 is unable to search any database indexes stored in a secondary data core (e.g., data cores 310, 316, and 318) until after the secondary data core is recovered in data plane 330.

In some embodiments, management plane 320 creates an initial list L 302A that indicates the set of data cores 306 and 308 in data plane container 304 and secondary data cores 316 and 318 in secondary storage system 340 contain data items within a time range specified in the search request. In some embodiments, L 302A lists a subset of the plurality of data cores and secondary data cores to be searched. In some embodiments, L 302A is updated to only include the data cores and secondary data cores determined to possibly contain the requested data items. In some embodiments, management plane 320 stores L 302A in metadata 302. In some embodiments, metadata 302 includes probabilistic data structures, (e.g., Bloom filters) used to determine data cores and/or secondary data cores that contain relevant data items. In some embodiments, data cores and/or secondary data cores that do not contain data items within the specified time range are not searched, and are therefore removed from L 302A. By limiting the search to a subset of data cores and secondary data cores that possibly contain the requested data items, the management plane 320 reduces the overhead (e.g., process cycles) associated with searching data cores and secondary data cores that do not contain any data items that fall within the specified time range. Pre-filtering data cores and secondary data cores improves the efficiency of the search by reducing the total search time and processing power used to search and recover data cores.

In some embodiments, if secondary data core 318 is identified in L 302A, then secondary data core 318 must be recovered in data plane container 304 before it is accessible. In some embodiments, prior to recovering secondary data core 318 in data plane container 304, management plane 302 determines whether there is enough available storage in data plane 330 to recover at least one secondary data core (e.g., secondary data core 318). In some embodiments, management plane 302 additionally determines whether one or more predetermined criteria are satisfied. In some embodiments if the available storage in data plane 330 is sufficient and the one or more predetermined criteria are satisfied, then management plane 302 recovers secondary data cores listed in L 302A in data plane 330. In some embodiments, if data plane container 304 is determined to have a sufficient amount of storage available to recover at least one of the secondary data cores listed in L 302A, but one or more predetermined conditions are not satisfied, then no secondary data cores are recovered in data plane container 304. In some embodiments, if data plane container 304 is determined to have insufficient storage available to recover additional cores in the data plane, then no secondary data cores are recovered or searched.

In some embodiments, the one or more predetermined criteria include the management plane 320 determining that the tenant has enough storage allocated in the data plane container 304 to recover at least one secondary data core listed in L. For example, management plane 320 determines that the amount of available storage allocated to Tenant 1 is 500 Gigabytes (GB) and that recovering secondary data core 318 in data plane container 304 requires 100 GB. In this example, management plane 320 determines that the amount of available storage in data plane container 304 is sufficient to recover secondary data core 318 in data plane container 304. In some embodiments, the management plane determines that the tenant does not have sufficient storage allocated in data plane container 304 and determines whether the tenant has paid to obtain additional storage in data plane container 304. If the tenant has not paid to obtain additional storage, then the one or more predetermined criteria are not satisfied, and the secondary data cores in L 302A will not be recovered in data plane 304 or be included in the search. On the other hand, if the tenant has paid to obtain additional storage to recover an additional data core, the management plane will proceed to recover secondary data cores in L 302A in the allocated storage. For example, secondary data core 318 is recovered in data plane container 304 in the new available storage.

In some embodiments, the predetermined criteria is based on the data ingestion rate of data plane container 304. In some embodiments, a faster data ingestion rate requires that data plane container 304 has a larger amount of storage available to recover at least one of the secondary data cores listed in L 302A. Conversely, a slower data ingestion rate requires less available storage to recover at least one of the secondary data cores listed in L 302A. Thus, the ingestion rate affects how much of the available storage is actually able to be allocated for recovering secondary data cores in data plane 304.

In some embodiments, the amount of available storage in data plane container 304 is dependent on the ability to retire available data cores (e.g., data cores 306, 308, 318) from the data plane container 304 in order to free up storage to recover secondary data core 318. In some embodiments, a data core (e.g., data core 306) is retired if it is closed, or at storage capacity and unable to store any additional data items. In contrast, an open data core, or a data core (e.g., data core 308) that is still capable of ingesting additional data items is not retired. For example, management plane 320 retires data core 306 in data plane container 304 by moving it to secondary storage system 340 in order to allocate additional storage for recovering secondary data core 318 in data plane container 304. Once data core 306 is retired to secondary storage system 340, it becomes a secondary data core in a warm state that is no longer directly accessible by the data plane. In some embodiments, data cores are retired according to the order in which the data cores were generated. For example, the oldest generated data core is the first to be retired. In some embodiments, data core 318 that was previously recovered in data plane container 304 for a prior search but is no longer needed is retired and a second secondary data core 316 from secondary storage system 340 is recovered in data plane container 304.

In some embodiments, once data plane 330 determines there is enough storage available in data plane container 304 to recover at least one secondary core 318 in data plane 330, management plane 320 creates exemplary list R 302B containing the set of secondary data cores that need to be recovered. In some embodiments, the set of secondary data cores in R 302B corresponds to the secondary data cores listed in L 302A. In some embodiments, lists L 302A and R 302B are stored as exemplary metadata 302 in management plane 320. In some embodiments, management plane 320 recovers secondary data cores in R 302B by recovering a secondary data core (e.g., secondary data core 318) in data plane container 304 from secondary storage system 340. In some embodiments, management plane 320 causes recovery of secondary data cores listed in R 302B using a secondary data core data recovery API. In some embodiments, once a secondary data core is recovered, its state changes from being in a warm state to an available (e.g., hot) state. In some embodiments, once the recovery of one or more secondary data cores in R 302B is complete, management plane 320 executes the search request on the data cores listed in L 302A. For example, management plane 320 causes data plane 330 to query the one or more recovered secondary data cores in accordance with the search request. In some embodiments, once management plane 320 determines that there is sufficient available storage in data plane container 304 to recover at least one secondary data core, management plane 320 will determine that the query may be run asynchronously and will inform the client application of this. In some embodiments, if there is not enough space to recover a secondary data core, the query will be executed synchronously as usual, using the data cores in data plane 330.

A query that is executed asynchronously notifies the querying client immediately that the query is being executed even before the execution of the query has actually started. In some embodiments, a query includes a search request. This allows other queries to be run simultaneously without waiting for the asynchronous query to finish. The client may retrieve results at a later time when the results become available. In some embodiments, executing the search request asynchronously causes a response to be provided to a dashboard (e.g., dashboard 500, described below) to inform the user that the asynchronous search has started. In some embodiments, management plane 320 provides results to dashboard 500 when results become available. In some embodiments, the user dynamically starts or stops the asynchronous search through the user interface provided in dashboard 500. In some embodiments, the client polls the management plane for the progress of a query. In some embodiments, the client application provides management plane 320 of a callback point, which management plane 320 uses to callback to inform the client application of the asynchronous query results.

In some embodiments, if one or more secondary data cores from R 302B cannot be recovered, the unrecovered data cores are removed from L 302A and therefore not searched. In some embodiments, if no secondary data cores are recovered, then only the data cores listed in L 302A in data plane container 304 are searched. In some embodiments, if there are no secondary data cores listed in L 302A or there is insufficient storage available in data plane container 304 to recover at least one secondary core, then the query is executed synchronously and no data cores are recovered from the secondary storage system. In some embodiments, the status of the synchronous search is provided to dashboard 500.

In some embodiments, the management plane updates the default timeout period to cancel a query of the query API, so that new extended timeout accounts for the total amount of time to recover all the secondary data cores in R 302B. In some embodiments, the extended timeout is set to the total time to recover all secondary data cores added to the median query runtime for a tenant:

$$t = \text{expectedRecoveryTime} * \text{numWarmCores} + \text{medianTenantQueryExecutionTime}.$$

In some embodiments, the updated timeout is a worst case scenario time because the recovery of cores and execution of queries across the data cores in L 302A occurs concurrently, resulting in a faster total runtime. The timeout period is a threshold period of time a client must wait before the query is cancelled because execution of the query has exceeded the maximum amount of time to complete.

Figure 3B:
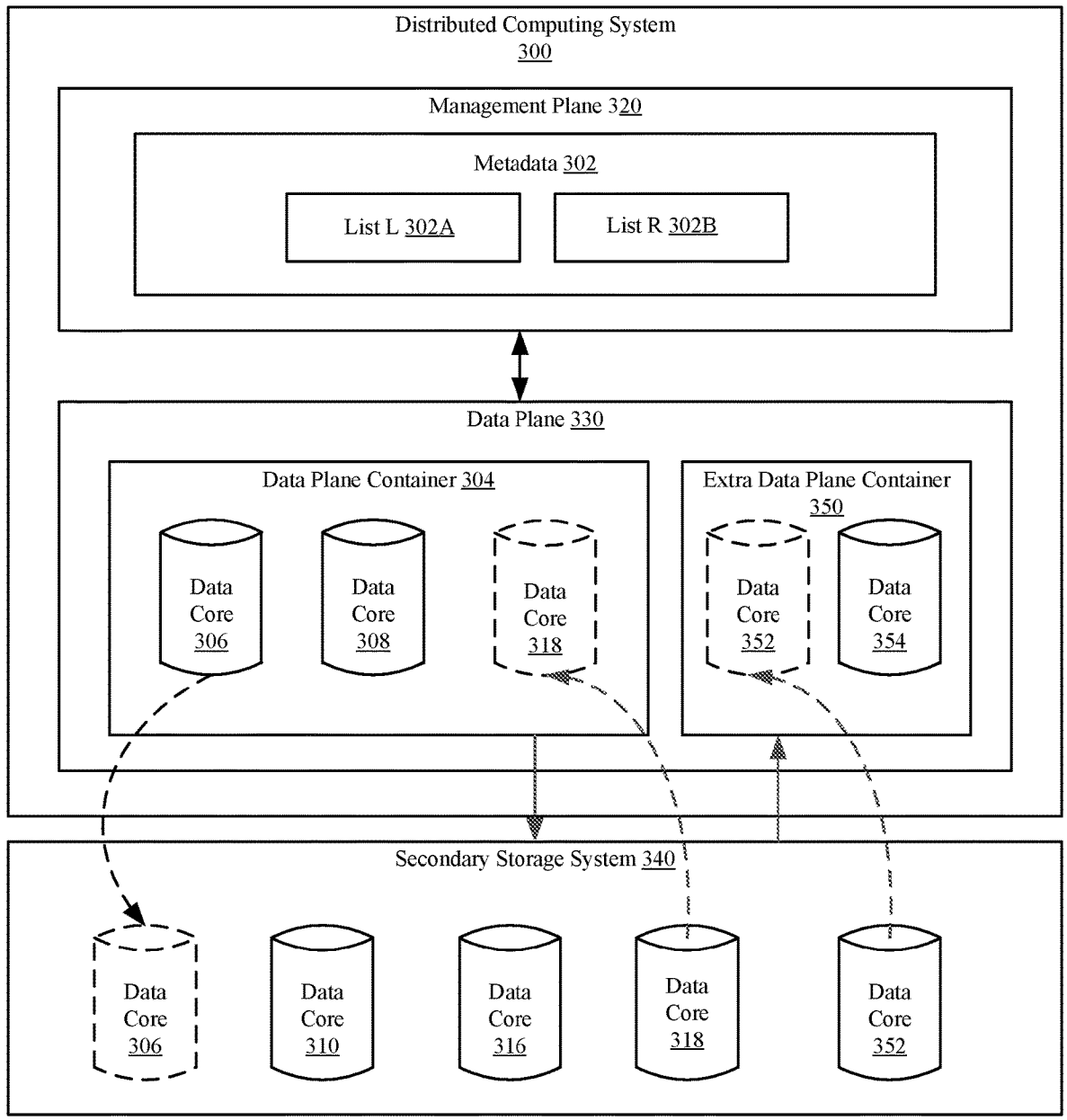
FIG. 3B depicts an exemplary system where an exemplary secondary data core in a secondary storage system is recovered in an exemplary new data plane container.

FIG. 3B depicts using an exemplary extra data plane container (EDC) 350 for recovering exemplary secondary data core 352 from exemplary secondary storage system 340. In some embodiments, management plane 320 uses EDC 350 to recover secondary cores 310, 316, and 352 listed in L 302A in data plane 330 instead of using data plane container 304 as illustrated in FIG. 3A. In some embodiments, EDC 350 is like data plane container 304, except it is dedicated to recovering secondary data cores in data plane 330. Secondary cores that are recovered in exemplary EDC 350 become hot data cores that are accessible by data plane 330 and thus are no longer in a warm state. In some embodiments, secondary data cores in L 302A that are not available in data plane container 304 nor EDC 350 are recovered in the EDC 350 before they are accessible.

In some embodiments, EDC 350 is shared by several tenants. In some embodiments, a tenant may purchase additional storage in EDC 250 in order to recover additional data cores in data plane 330. In some embodiments, a first tenant purchases a different amount of storage than a second tenant. In some embodiments, a tenant may purchase all of the storage available in the EDC for exclusive use.

The addition of EDC 350 in data plane 330 provides several benefits over using data plane container 304 for recovering secondary data cores 310, 316, and 352 in data plane 330. EDC 350 provides a dedicated storage space for recovering secondary data cores in the data plane, so that storage does not need to be computed every time a secondary data core needs to be accessed. The amount of storage allocated to EDC 350 is independent of the amount of storage allocated to data plane container 304. Thus, recovering secondary data cores in EDC 350 will not affect the storage and distribution of data cores stored in data plane container 304.

Further, secondary data cores added to EDC 350 will not impact the ingestion rate and data core management in data plane container 304. In some embodiments, because EDC 350 is dedicated to storing secondary data cores, the amount of storage available in EDC 350 is not limited by the ingestion rate of the tenant's data plane container that is storing incoming data. In some embodiments, EDC 350 eliminates the need to retire older data cores that are not being used in the primary data plane container 304 because secondary data cores are being recovered in a separate data plane container (e.g., EDC 350).

In some embodiments, EDC 350 reduces the amount of overhead to clean up after executing a query. In some embodiments, cleanup procedures include removing recovered secondary data cores from the data plane container 304 or re-allocating the storage used from a prior query back to data plane container 304. In some embodiments, subsequent queries run faster because the secondary data cores that are needed for future queries have already been recovered in EDC 350.

In some embodiments, prior to recovering secondary data core 352 from secondary storage system 340 to EDC 350, the management plane determines whether EDC 350 has sufficient storage available to recover at least one secondary data core. In some embodiments, the EDC is configured to have enough available storage for at least one data core, so that at any given time, there is a sufficient amount of available storage to execute queries on at least one secondary data core listed in L 302A. In some embodiments, any data cores that are stored in the EDC but are not listed in L 302A are removed to increase the amount of available storage for recovering secondary data cores in L 302A. For example, exemplary data core 354 in EDC 350 is a data core that has been recovered in exemplary EDC 350 from a prior search request. Since data core 354 is not listed in L 302A, it is removed from EDC 350 in order to make space for other secondary data cores. In some embodiments, removing data core 354 from EDC 350 involves moving the data core to secondary storage system 340. In some embodiments, data cores in EDC 350 are removed from oldest first in the order the data cores were recovered.

In some embodiments, management plane 320 recovers secondary data cores from R 302B. In some embodiments, management plane 320 checks to determine whether a secondary data core listed in R 302B has been previously recovered and recovered in EDC 350. If the secondary data core is currently accessible in the data plane, it does not need to be re-recovered. In some embodiments, management plane 320 allocates storage in EDC 350 and recovers secondary data core 352 in EDC 350 from secondary storage system 340. Secondary data core 352 becomes a hot data core once it is recovered and recovered in EDC 350. In some embodiments, the management plane recovers data cores listed in R 302B using a core data recovery API. In some embodiments, once the recovery of one or more secondary data cores in R 302B is complete, management plane 320 executes the search request on the data cores in L 302A. For example, management plane 320 causes data plane 330 to query the one or more recovered secondary data cores in accordance with the search request. In some embodiments, if one or more secondary data cores from R 302B cannot be recovered, the respective secondary data cores are removed from L 302A and therefore not searched.

Figure 7:
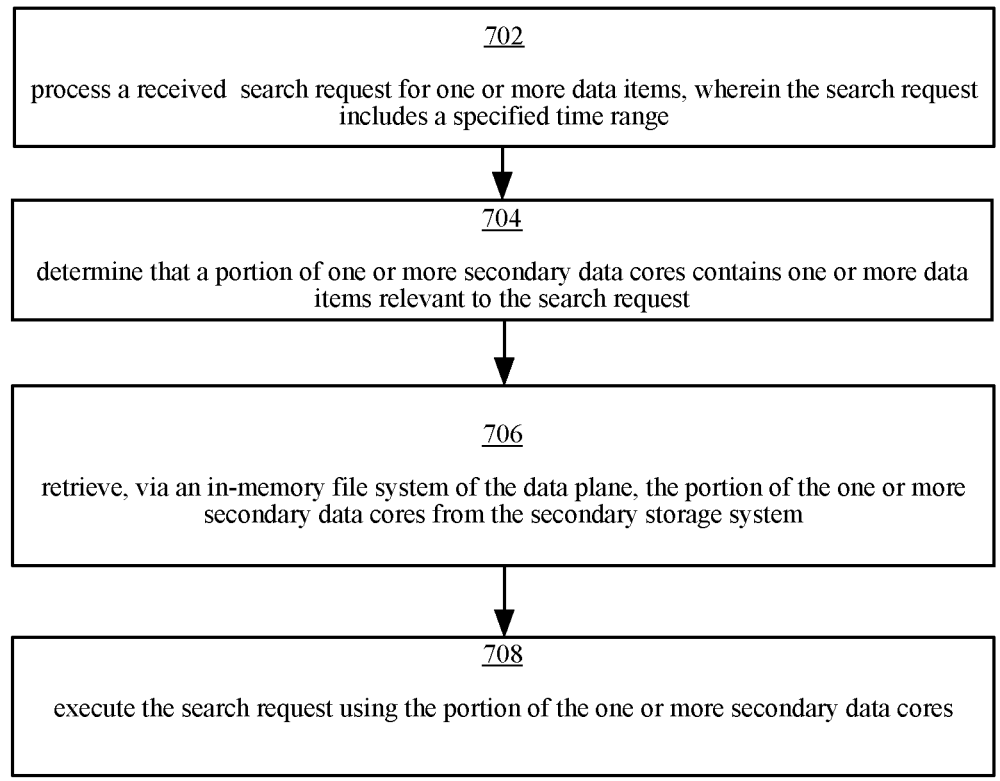
FIG. 7 depicts an exemplary process for executing asynchronous search requests for data items in a specified time range on a plurality of secondary data cores using an in-memory file system.

Once management plane 320 has recovered the secondary data cores needed for the search request, management plane 320 executes the search request on the data cores and the recovered secondary data cores listed in L 302A. In some embodiments, a search request is a query. A search request that is executed asynchronously notifies the querying client that the search request is being executed even before the execution of the search request has actually started. This allows other search requests to run simultaneously without waiting for the asynchronous search request to finish. In some embodiments, the client can retrieve results of running asynchronous search requests at a later time as the results become available. In some embodiments, the client is notified of the availability of results through a callback or by polling for results. In some embodiments, the client is able to access the results asynchronous search requests through a user interface or dashboard as illustrated in FIG. 7.

In some embodiments, if there is an insufficient amount of available storage to recover at least one secondary data core, the search request is executed synchronously and no secondary data cores are recovered from the secondary storage system. In some embodiments, if the management plane determines that no secondary data cores are listed in L 302A, the search request is executed synchronously on only the data cores in L 302A.

In some embodiments, the management plane also updates the default timeout period to cancel a query of the query API, to an extended timeout that accounts for the total amount of time to recover all the secondary data cores in R 302B in the EDC. The extended timeout is set to the total secondary data core recovery time added to the median query runtime for a tenant:

$$t = expectedRecoveryTime * numWarmCores + medianTenantQueryExecutionTime.$$

In some embodiments, this updated timeout is a worst case scenario time because the recovery of cores and execution of queries across the data cores in L 302A may occur concurrently, resulting in a quicker total runtime. The timeout period is a threshold period of time a client must wait before the query is cancelled because execution of the query has exceeded the maximum amount of time to complete.

Figure 4:
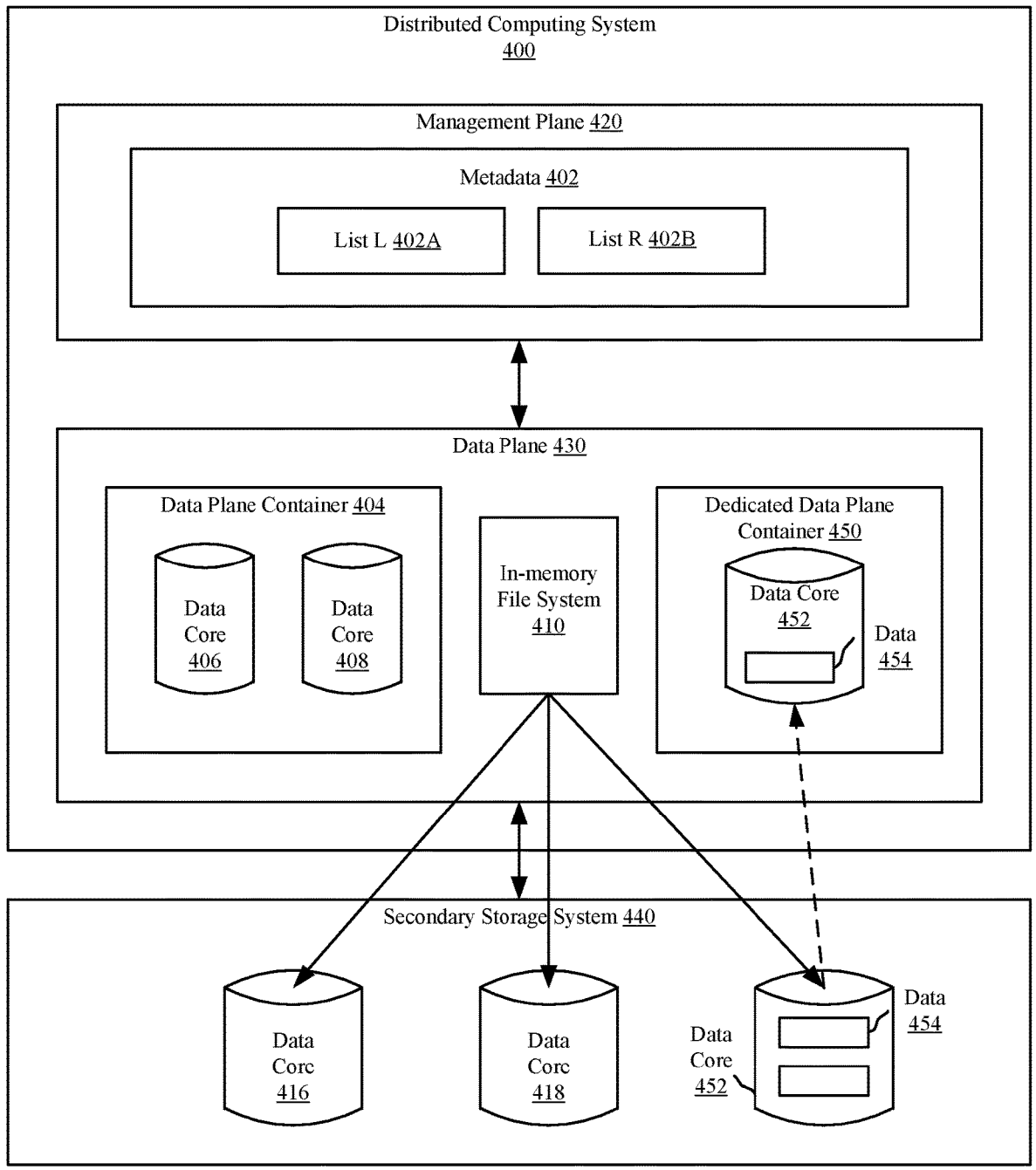
FIG. 4 depicts an exemplary system where an exemplary file system is used to retrieve data items from a secondary data core in a secondary storage system to the data plane container.
Figure 6:
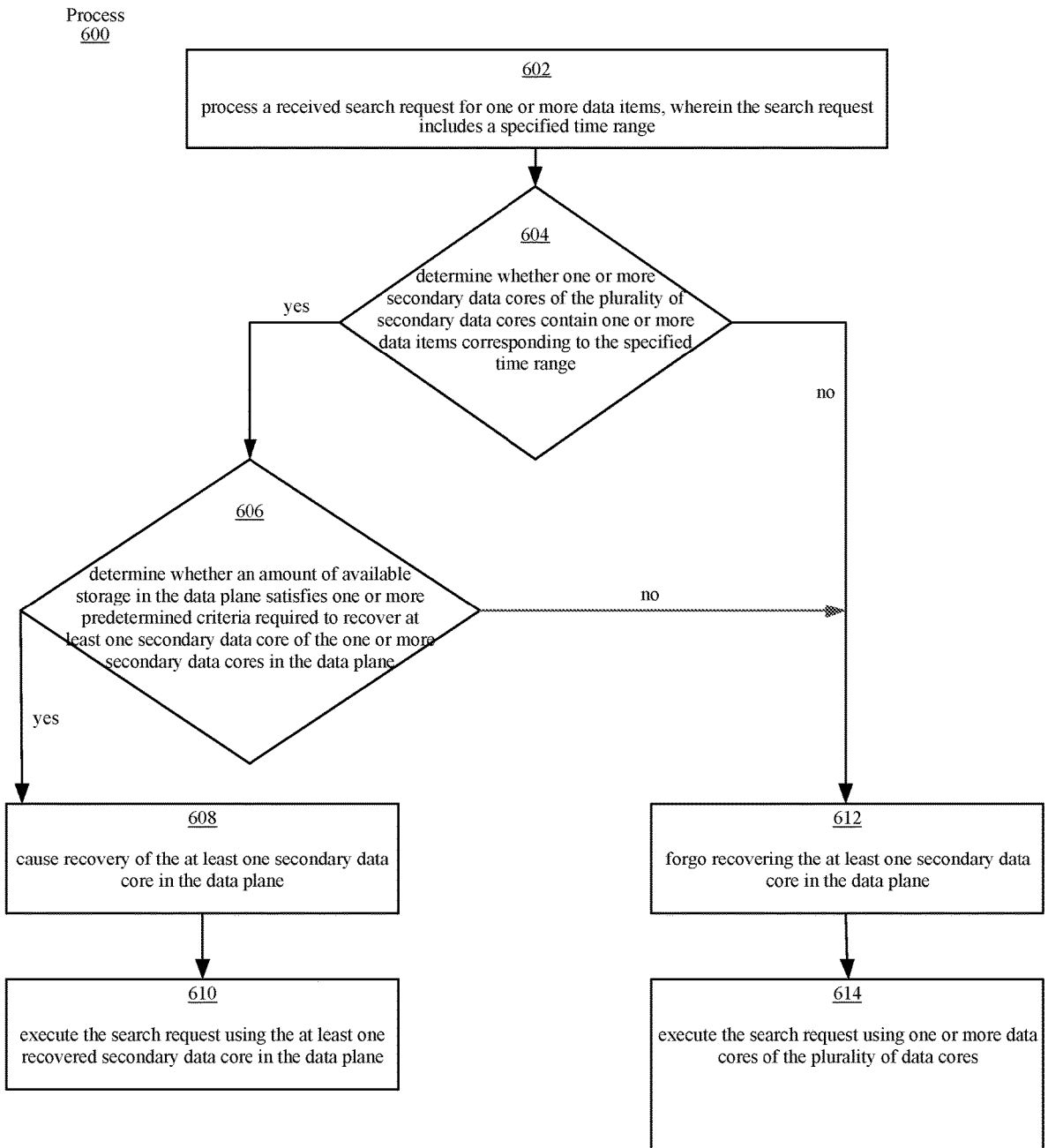
FIG. 6 depicts an exemplary process for executing asynchronous search requests for data items in a specified time range on a plurality of data cores in an exemplary data plane and in an exemplary second storage.

FIG. 4 depicts using exemplary in-memory file system 410 to recover portions of memory from exemplary secondary data core 452 of exemplary secondary storage system 440. In some embodiments, distributed computing system 400 is similar to that of FIG. 2 and FIGS. 3A-3B. In some embodiments, in-memory file system 410 maps the files (e.g., file 454) stored on each secondary data core (e.g., secondary data core 452) in secondary storage system 440 so that the files are retrieved directly from a specific secondary data core (e.g., secondary data core 452), thereby eliminating the need to recover the specific secondary data cores in data plane 430. In some embodiments, in-memory file system 410 provides the illusion of being a local file system, but accesses files stored remotely. In some embodiments, in-memory file system 410 resides in data plane 430. In some embodiments, the in-memory file system is implemented by Alluxio™, a system that unifies data storage at memory speed. In some embodiments, in-memory file system 410 is used to provide direct access to individual data files (e.g., data files 454) that are stored in secondary storage system 440 during execution of the search request. In some embodiments, secondary storage system 440 is a cloud object storage system. Using in-memory file system 410 to directly access files corresponding to the requested data items without having to recover secondary data cores in the data plane container shifts the responsibility of storage management and data transfer to the in-memory file system instead of the management plane, which provides the benefits of reducing overhead and expediting the query processing time.

In some embodiments, files retrieved by in-memory file system 410 are stored in data plane container 404. In some embodiments, data plane container 404 does not have enough storage available to store data files (e.g., data 454) retrieved from secondary storage system 440. In some embodiments, one solution is to offer the tenant the option to purchase additional storage or additional data cores in an existing data plane container to store the files retrieved from the one or more secondary data cores. However, this is dependent on the amount of storage that is available in the data plane container. In some embodiments, another solution is to add a dedicated data plane container (DDC) 450 to data plane 430 that is dedicated to storing data retrieved from secondary data cores. In some embodiments, DDC 450 is similar to data plane container 404. The DDC may be shared by several tenants or be used exclusively by a single tenant. Tenants may purchase additional storage in the DDC. In some embodiments, if files 454 are needed but are stored in a secondary data core 452 in secondary storage system 440, data files 454 are recovered from secondary data core 452 and stored in a corresponding new data core 452 in DDC 450. Each data core in DDC 450 may contain data from only one secondary data core. In some embodiments, if files from secondary data cores 416, 418, and 452 are all needed, then new data cores corresponding to each of the secondary data cores 416, 418, and 452 would need to be created in DDC 450 to store the corresponding data. In some embodiments, entire secondary data core 452 is recovered and loaded into data core 452 in DDC 450.

In some embodiments, management plane 420 processes the received query, by determining whether secondary data cores are relevant in the search request. In some embodiments, management plane 420 determines whether files are needed from any secondary data cores and creating list L 402A to track secondary data cores that contain relevant data files. In some embodiments, L 402A is similar to L 302A and R 402B is similar to R 302B. In some embodiments, if management plane 420 determines there is available storage in data plane container 404, in-memory file system 410 retrieves data files from secondary data cores listed in R 402B and stores the files in data plane container 404. In some embodiments, if management plane 420 determines there is available storage in DDC 450, in-memory file system 410 retrieves data files from secondary data cores listed in R 402B and stores the files in DDC 450. In some embodiments, once management plane 420 has determined that files on secondary data cores are needed for the search request, management plane 420 executes the search request asynchronously as the in-memory file system retrieves files from secondary data cores. In some embodiments, if no files are needed from any secondary data cores, management plane 420 executes the search request synchronously.

In some embodiments, an asynchronous query includes two optional parameters: a Boolean parameter that indicates whether a client wants to allow asynchronous queries and a callback parameter that contains the URL to notify the client when query results are ready. In some embodiments, if the Boolean parameter is not set to allow asynchronous queries, the management plane will only execute queries synchronously, which means no secondary data cores will be searched. In some embodiments, if the Boolean parameter is set to allow asynchronous queries, the management plane will search secondary data cores. In some embodiments, if asynchronous queries are permitted, the management plane may notify the client that the query has started but not return any results. Instead, the client will be notified at a later time when results become available. In some embodiments, the callback parameter is a client-defined URL destination where query results are displayed when available. In some embodiments, if no callback URL destination is set, then it is assumed the client will poll for results. In some embodiments, the query service has a GET operation that may be called to indicate whether a specified query has completed. The client can use the GET operation to implement a polling mechanism to notify the client when the query has completed if no callback URL was provided. In some embodiments, because queries over secondary data cores are time and computationally expensive, queries that are not being polled periodically will be canceled.

FIG. 5 depicts a user interface displaying a dashboard 500 that allows the client to see indications of all the pending queries 502-506 that are currently executing in the distributed computing system. In some embodiments, the management plane passes results through the user interface layer to cause query statuses and query results to be displayed to the user in dashboard 500. In some embodiments, asynchronous queries 502, 504, and 506 are displayed. In some embodiments, the client dynamically starts or stops an asynchronous query from the dashboard by clicking on the respective start or stop button of the asynchronous query. The client can also cancel an asynchronous query via dashboard 500. These actions are passed through the user interface layer to cause the management plane to start, stop and cancel asynchronous queries. In some embodiments, dashboard 500 displays the status of each query, which may be any one of running, stopped, not started or canceled. In some embodiments, if the client has provided a URL destination, the results will be displayed in the URL upon completion of the query process. In some embodiments, if the client has not provided a URL destination, the client may continually poll the query process to determine when the query has completed. In some embodiments, for asynchronous queries, if the user has not provided a URL and the query is not being polled periodically, the query will automatically be cancelled. In some embodiments, the client can add additional, customizable fields to dashboard 500. In some embodiments, the client receives an alert when the polling mechanism indicates that the query has finished. In some embodiments, the client receives an alert or is notified by email when query results have been posted to the URL.

In the description below, process 600 is performed by a management plane in a distributed computing system similar to that of FIGS. 2-4. In some embodiments, the operations of process 600 are distributed over several management nodes in a management plane. It should be appreciated that the order for performing the blocks of FIG. 6 can be modified. Further, one or more blocks of process 600 can be optional and/or additional blocks can be performed.

At block 602, the management plane of the distributed computing system processes a received search request (e.g., user query) for one or more data items within a specified time range. In some embodiments, a user (e.g., administrator) accesses, via user terminals, user interfaces provided by a user layer of the distributed computing system to enter the search request. In some embodiments, the management plane processes the search request received from the user interface layer. In some embodiments, the search request specifies a time range for log data that is stored across a plurality of data cores in one or more data plane containers. In some embodiments, the search request specifies a time range for log data or records that are stored in the secondary storage system. In some embodiments, the search request specifies a time range for log data that is not found in the data plane.

At block 604, the management plane determines whether there are one or more secondary data cores of the plurality of secondary data cores that contain one or more data items corresponding to the specified time range. In some embodiments, the management plane queries metadata stored on the management plane to determine whether any data items spanning the specified time range are stored on one or more secondary data cores of the plurality of secondary data cores. In some embodiments, the metadata includes probabilistic data cores such as Bloom filters, which are used to determine whether a data core possibly contains data items with timestamps that fall within the specified time range. n some embodiments, in accordance with a determination that one or more secondary data cores contain one or more data items corresponding to the specified time range, the management plane creates a list L that lists the one or more secondary data cores containing one or more data items corresponding to the specified time range. In some embodiments, in accordance with a determination that none of the plurality of secondary data cores contain one or more data items corresponding to the specified time range, the management plane does not include any secondary data cores in L.

At block 606, the management plane determines whether an amount of available storage in the data plane satisfies one or more predetermined criteria required to recover at least one secondary data core of the one or more secondary data cores in the data plane. In some embodiments, the one or more predetermined criteria is based on a total amount of storage allocated to the tenant for the data plane. In some embodiments, the tenant obtains additional storage in the data plane if there is insufficient storage space allocated to the tenant. In some embodiments, the one or more predetermined criteria includes a predetermined criterion that the amount of available storage in the data plane is greater than the amount of storage required to recover the at least one secondary data core by a predetermined threshold amount. In some embodiments, the one or more predetermined criteria is based on a current ingestion rate of data items by the data plane.

Once the management plane determines there is sufficient storage to recover secondary data cores or data from secondary data cores, the management plane creates list R, which contains a list of secondary data cores in which the whole core or a portion of the core needs to be recovered. At block 608, the management plane recovers the at least one secondary data core in the data plane. In some embodiments, the management plane recovers secondary data cores based on the secondary data cores listed in R. In some embodiments, the management plane may recover secondary data cores using any of the techniques described above with reference to FIGS. 3A and 3B. In some embodiments, the management plane recovers a data core from a secondary storage system in the data plane container. In some embodiments, the management plane recovers a data core from a secondary storage system in an EDC.

At block 610, the management plane executes the search request using the at least one secondary data core that is recovered in the data plane. Executing the search request includes, for example, causing the data plane to query the at least one secondary data core recovered the data plane in accordance with the search request. In some embodiments, the management plane executes the search request asynchronously upon determining that the amount of available storage in the data plane satisfies one or more predetermined criteria required to recover at least one secondary data core from the secondary storage system in the data plane. In some embodiments, a user can dynamically start and stop asynchronous queries in a user interface such as through dashboard 500. In some embodiments, the management plane executes the search request synchronously if no secondary data cores are involved in the search request or in accordance with a determination that the amount of available storage in the data plane fails to satisfy one or more predetermined criteria required to recover at least one secondary data core from the secondary storage system in the data plane.

At blocks 612-614, in accordance with a determination that an amount of available storage in the data plane does not satisfy one or more predetermined criteria required to recover at least one secondary data core in the data plane, the management plane forgoes recovering the at least one secondary data core in the data plane and executes the search request using the one or more data cores in the plurality of data cores determined to contain one or more data items corresponding to the specified time range. For example, the management plane causes the data plane to query the one or more data cores in accordance with the search request. In some embodiments, if the management plane determines that there are no secondary data cores that need to be recovered in the data plane, the management plane executes the search request synchronously.

Process 700 is performed by a management plane in a distributed computing system similar to that of FIGS. 2-4. In some embodiments, the operations of process 700 are distributed over several management nodes in a management plane. It should be appreciated that the order for performing the blocks of FIG. 7 can be modified. Further, one or more blocks of process 700 can be optional and/or additional blocks can be performed.

At block 702, the management plane processes a received search request for one or more data items, wherein the search request includes a specified time range. In some embodiments, a user (e.g., administrator) accesses, via user terminals, user interfaces provided by a user interface layer of the distributed computing system to enter the search request. In some embodiments, the management plane processes the search request received from the user interface layer. In some embodiments, the search request specifies a time range for log data that is stored across a plurality of data cores in one or more data plane containers. In some embodiments, the search request specifies a time range for log data or records that are stored in the secondary storage system. In some embodiments, the search request specifies a time range for log data that is not found in the data plane.

At block 704, the management plane determines whether a portion of one or more secondary data cores contains one or more data items relevant to the search request. In some embodiments, the management plane queries metadata stored on the management plane to determine whether any data items spanning the specified time range are stored on one or more secondary data cores of the plurality of secondary data cores. In some embodiments, the metadata includes probabilistic data cores such as Bloom filters, which are used to determine whether a data core possibly contains data items with timestamps that fall within the specified time range. In some embodiments, in accordance with a determination that one or more secondary data cores contain one or more data items corresponding to the specified time range, the management plane creates a list L that lists the one or more secondary data cores containing one or more data items corresponding to the specified time range. In some embodiments, in accordance with a determination that none of the plurality of secondary data cores contain one or more data items corresponding to the specified time range, the management plane does not include any secondary data cores in L.

At block 706, in accordance with a determination that a portion of one or more secondary data cores contains one or more data items relevant to the search request, the management plane retrieves, via an in-memory file system of the data plane, the portion of the one or more secondary data cores from the secondary storage system. In some embodiments, the in-memory file system stores an index that determines where the requested data items are stored in the corresponding secondary data core. In some embodiments, the requested data items are recovered in a data plane container or a DDC. In some embodiments, the tenant obtains additional storage in the data plane if there is insufficient storage space allocated to the tenant.

At block 708, once the requested data items are loaded in the data plane, the management plane executes the search request using the portion of the one or more secondary data cores. In some embodiments, the management plane executes the search request asynchronously if data items are identified on secondary data cores. In some embodiments, a user can dynamically start and stop asynchronous queries in a user interface such as through dashboard 500. In some embodiments, the management plane executes the search request synchronously if no portions of secondary data cores are involved in the search request.

While processes 600 and 700 are described in the context of a distributed computing system and a secondary storage system, it should be understood that processes 600 and 700 can be performed using other systems and environments, such as a network of servers that implements a database platform and a backup and archive storage platform.

The foregoing descriptions of specific embodiments, as described with reference to FIGS. 1-7, have been presented for purposes of illustration and description. They are not intended to be exhaustive or to limit the scope of the claims to the precise forms disclosed, and it should be understood that many modifications and variations are possible in light of the above descriptions.

What is claimed is:

1. A method for querying timestamped data items stored across a plurality of data cores and a plurality of secondary data cores, the plurality of data cores stored at a data plane of a distributed computing system and the plurality of secondary data cores stored at a secondary storage system external to the distributed computing system, the method comprising:

at a management plane of the distributed computing system:
processing a received search request for one or more data items, wherein the search request includes a specified time range;
determining whether one or more secondary data cores of the plurality of secondary data cores contain one or more data items corresponding to the specified time range;
in accordance with a determination that one or more secondary data cores of the plurality of secondary data cores contain one or more data items corresponding to the specified time range:
determining whether an amount of available storage in the data plane satisfies one or more predetermined criteria required to recover at least one secondary data core of the one or more secondary data cores in the data plane;
in accordance with a determination that an amount of available storage in the data plane satisfies one or more predetermined criteria required to recover at least one secondary data core of the one or more secondary data cores in the data plane:
causing recovery of the at least one secondary data core in the data plane; and
executing the search request using the at least one recovered secondary data core in the data plane.

2. The method of claim 1, further comprising:
in accordance with a determination that an amount of available storage in the data plane does not satisfy one or more predetermined criteria required to recover at least one secondary data core of the one or more secondary data cores in the data plane:
forgo recovering the at least one secondary data core in the data plane; and
executing the search request using one or more data cores of the plurality of data cores, the one or more data cores determined to contain one or more data items corresponding to the specified time range.

3. The method of claim 1, further comprising:
in accordance with a determination that an amount of available storage in the data plane does not satisfy one or more predetermined criteria required to recover at least one secondary data core of the one or more secondary data cores in the data plane:
performing, by the management plane, one or more operations to increase the amount of available storage in the data plane;
after performing the one or more operations, causing recovery of the at least one secondary data core in the data plane; and executing the search request using the at least one recovered secondary data core.

4. The method of claim 3, wherein performing the one or more operations includes allocating, by the management plane, additional storage to the data plane.

5. The method of claim 3, wherein performing the one or more operations includes:
   selecting one or more data cores of the plurality of data cores, the one or more data cores determined to not contain any data items corresponding to the specified time range;
   generating one or more new secondary data cores in the secondary storage system by transferring the one or more data cores to the secondary storage system; and
   removing the one or more data cores from the data plane.

6. The method of claim 3, wherein prior to receiving the search request, the data plane includes one or more data plane containers storing the plurality of data cores, and wherein performing the one or more operations includes:
   allocating an additional data plane container to the data plane; and
   causing recovery of the at least one secondary data core in the additional data plane container.

7. The method of claim 1, wherein prior to receiving the search request, the data plane includes one or more data plane containers storing the plurality of data cores, and wherein the at least one secondary data core is recovered in a data plane container of the one or more data plane containers.

8. The method of claim 1, further comprising:
   causing recovery of at least one other secondary data core of the one or more secondary data cores in the data plane;
   replacing the at least one recovered secondary data core in the data plane with the at least one other recovered secondary data; and
   executing the search request using the at least one other recovered secondary data core.

9. The method of claim 1, wherein the one or more predetermined criteria is based on a current ingestion rate of data items by the data plane.

10. The method of claim 1, wherein the search request is associated with a tenant, and wherein the one or more predetermined criteria is based on a total amount of storage allocated to the tenant for the data plane.

11. The method of claim 1, wherein the plurality of data cores stored in the data plane are assigned to a first tenant of a plurality of tenants, and a second plurality of data cores stored in the data plane are assigned to a second tenant of a plurality of tenants.

12. The method of claim 11, wherein the first tenant is allocated a first amount of storage in the data plane and the second tenant is allocated a second amount of storage different from the first amount of storage.

13. The method of claim 1, further comprising:
   in accordance with a determination that one or more secondary data cores of the plurality of secondary data cores contain one or more data items corresponding to the specified time range, providing an output indicating that the search request will be executed asynchronously, wherein the output is provided prior to executing the search request.

14. The method of claim 1, further comprising:
   in accordance with a determination that none of the plurality of secondary data cores contain one or more data items corresponding to the specified time range:
   executing the search request using one or more data cores of the plurality of data cores, the one or more data cores determined to contain one or more data items corresponding to the specified time range; and
   forgo providing an output to a user until after a result is obtained from executing the search request using the one or more data cores.

15. The method of claim 1, wherein a timeout condition to cancel the search request is based on a default time period, and further comprising:
   in accordance with a determination that an amount of available storage in the data plane satisfies one or more predetermined criteria required to recover at least one secondary data core of the one or more secondary data cores in the data plane, modifying the timeout condition to be based on an extended time period rather than the default time period, wherein the extended time period is based on a total number of secondary data cores in the at least one secondary data core.

16. The method of claim 1, further comprising:
   in accordance with a determination that one or more secondary data cores of the plurality of secondary data cores contain one or more data items corresponding to the specified time range:
   causing display of a user interface containing a list of asynchronous queries being processed by the management plane, the list of asynchronous queries including the search request, wherein the user interface enables a user to stop or start execution of the search request.

17. The method of claim 16, further comprising:
   after completing execution of the search request, causing display of results obtained from executing the search request in response to receiving a user selection of the search request via the user interface.

18. A method for querying timestamped data items stored across a plurality of data cores and a plurality of secondary data cores, the plurality of data cores stored at a data plane of a distributed computing system and the plurality of secondary data cores stored at a secondary storage system external to the distributed computing system, the method comprising:
   at a management plane of the distributed computing system:
   processing a received search request for one or more data items, wherein the search request includes a specified time range;
   determining whether a portion of one or more secondary data cores contains one or more data items relevant to the search request;
   in accordance with a determination that a portion of one or more secondary data cores contains one or more data items corresponding to the specified time range, changing a state of the one or more secondary data cores from a first state in which the one or more secondary data cores are not accessible from the data plane to a second state in which the one or more secondary data cores are accessible from the data plane and retrieving, via an in-memory file system of the data plane, the one or more data items from the portion of the one or more secondary data cores from the secondary storage system while the one or more secondary data cores are in the second state; and
   executing the search request using the one or more data items secondary data cores.

19. The method of claim 18, wherein the in-memory file system provides a mapping of files of the plurality of secondary data cores and provides the data plane access to the files of the plurality of secondary data cores.

20. The method of claim 18, wherein retrieving the one or more data items from the portion of the one or more secondary data cores comprises saving the one or more data items on one or more data cores of the plurality of data cores.

21. The method of claim 18, further comprising:
determining whether an amount of available storage in the data plane satisfies one or more predetermined criteria required to recover the portion of the one or more secondary data cores in the data plane; and
in accordance with a determination that an amount of available storage in the data plane satisfies one or more predetermined criteria required to recover the portion of the one or more secondary data cores in the data plane:
recovering the portion of the one or more secondary data cores in the data plane.

22. A non-transitory computer-readable storage medium comprising one or more programs configured to be executed by one or more processors of a distributed computing system, the one or more programs including instructions for:
at a management plane of the distributed computing system:
processing a received search request for one or more data items, wherein the search request includes a specified time range;
determining whether one or more secondary data cores of the plurality of secondary data cores contain one or more data items corresponding to the specified time range;
in accordance with a determination that one or more secondary data cores of the plurality of secondary data cores contain one or more data items corresponding to the specified time range:
determining whether an amount of available storage in the data plane satisfies one or more predetermined criteria required to recover at least one secondary data core of the one or more secondary data cores in the data plane;
in accordance with a determination that an amount of available storage in the data plane satisfies one or more predetermined criteria required to recover at least one secondary data core of the one or more secondary data cores in the data plane:
causing recovery of the at least one secondary data core in the data plane; and
executing the search request using the at least one recovered secondary data core in the data plane.

23. The non-transitory computer-readable storage medium of claim 22, further comprising:
in accordance with a determination that an amount of available storage in the data plane does not satisfy one or more predetermined criteria required to recover at least one secondary data core of the one or more secondary data cores in the data plane:
executing the search request using one or more data cores of the plurality of data cores, the one or more data cores determined to contain one or more data items corresponding to the specified time range, wherein the search request is executed without recovering the at least one secondary data core in the data plane.

24. The non-transitory computer-readable storage medium of claim 22, further comprising:
in accordance with a determination that an amount of available storage in the data plane does not satisfy one or more predetermined criteria required to recover at least one secondary data core of the one or more secondary data cores in the data plane:
performing, by the management plane, one or more operations to increase the amount of available storage in the data plane;
after performing the one or more operations, causing recovery of the at least one secondary data core in the data plane; and
executing the search request using the at least one recovered secondary data core.

25. A distributed computing system comprising:
one or more processors and
a memory storing one or more programs configured to be executed by the one or more processors, the one or more programs including instructions for:
at a management plane of the distributed computing system:
processing a received search request for one or more data items, wherein the search request includes a specified time range;
determining whether one or more secondary data cores of the plurality of secondary data cores contain one or more data items corresponding to the specified time range;
in accordance with a determination that one or more secondary data cores of the plurality of secondary data cores contain one or more data items corresponding to the specified time range:
determining whether an amount of available storage in the data plane satisfies one or more predetermined criteria required to recover at least one secondary data core of the one or more secondary data cores in the data plane;
in accordance with a determination that an amount of available storage in the data plane satisfies one or more predetermined criteria required to recover at least one secondary data core of the one or more secondary data cores in the data plane:
causing recovery of the at least one secondary data core in the data plane; and
executing the search request using the at least one recovered secondary data core in the data plane.

26. The distributed computing system of claim 25, further comprising:
in accordance with a determination that an amount of available storage in the data plane does not satisfy one or more predetermined criteria required to recover at least one secondary data core of the one or more secondary data cores in the data plane:
forgo recovering the at least one secondary data core in the data plane; and
executing the search request using one or more data cores of the plurality of data cores, the one or more data cores determined to contain one or more data items corresponding to the specified time range.

27. The distributed computing system of claim 25, further comprising:
in accordance with a determination that an amount of available storage in the data plane does not satisfy one or more predetermined criteria required to recover at least one secondary data core of the one or more secondary data cores in the data plane:

performing, by the management plane, one or more operations to increase the amount of available storage in the data plane;

after performing the one or more operations, causing recovery of the at least one secondary data core in the data plane; and executing the search request using the at least one recovered secondary data core.

28. A non-transitory computer-readable storage medium comprising one or more programs configured to be executed by one or more processors of a distributed computing system, the one or more programs including instructions for:

at a management plane of the distributed computing system:

processing a received search request for one or more data items located in a plurality of data cores stored at a data plane of the distributed computing system and a plurality of secondary data cores stored external to the data plane, wherein the search request includes a specified time range;

determining whether one or more secondary data cores of the plurality of secondary data cores contains one or more data items relevant to the search request;

in accordance with a determination that the one or more secondary data cores contain one or more data items relevant to the search request, replacing one or more data cores of the plurality of data cores with the one or more secondary data cores; and executing the search request using the one or more secondary data cores.

29. The non-transitory computer-readable storage medium of claim 28, wherein the in-memory file system provides a mapping of files of the plurality of secondary data cores and provides the data plane access to the files of the plurality of secondary data cores.

30. The non-transitory computer-readable storage medium of claim 28, further comprising:

allocating an additional data plane container to the data plane; and recovering the portion of the one or more secondary data cores in the additional data plane container.

31. A distributed computing system comprising:

one or more processors and a memory storing one or more programs configured to be executed by the one or more processors, the one or more programs including instructions for:

at a management plane of the distributed computing system:

processing a received search request for one or more data items located in a plurality of data cores stored in a data plane of the distributed computing system and a plurality of secondary data cores stored external to the data plane, wherein the search request includes a specified time range;

determining whether the plurality of secondary data cores contains one or more data items relevant to the search request;

in accordance with a determination that a secondary data core of the plurality of secondary data cores contains one or more of the data items relevant to the search request, transferring, the secondary data core from the secondary storage system to an extra data plane container of the data plane that is shared by one or more other tenants; and executing the search request using the portion of the one or more secondary data cores.

32. The distributed computing system of claim 31, wherein the in-memory file system provides a mapping of files of the plurality of secondary data cores and provides the data plane access to the files of the plurality of secondary data cores.

33. The distributed computing system of claim 31, further comprising:

allocating an additional data plane container to the data plane; and recovering the portion of the one or more secondary data cores in the additional data plane container.

* * * * *